Patented Sept. 11, 1923.

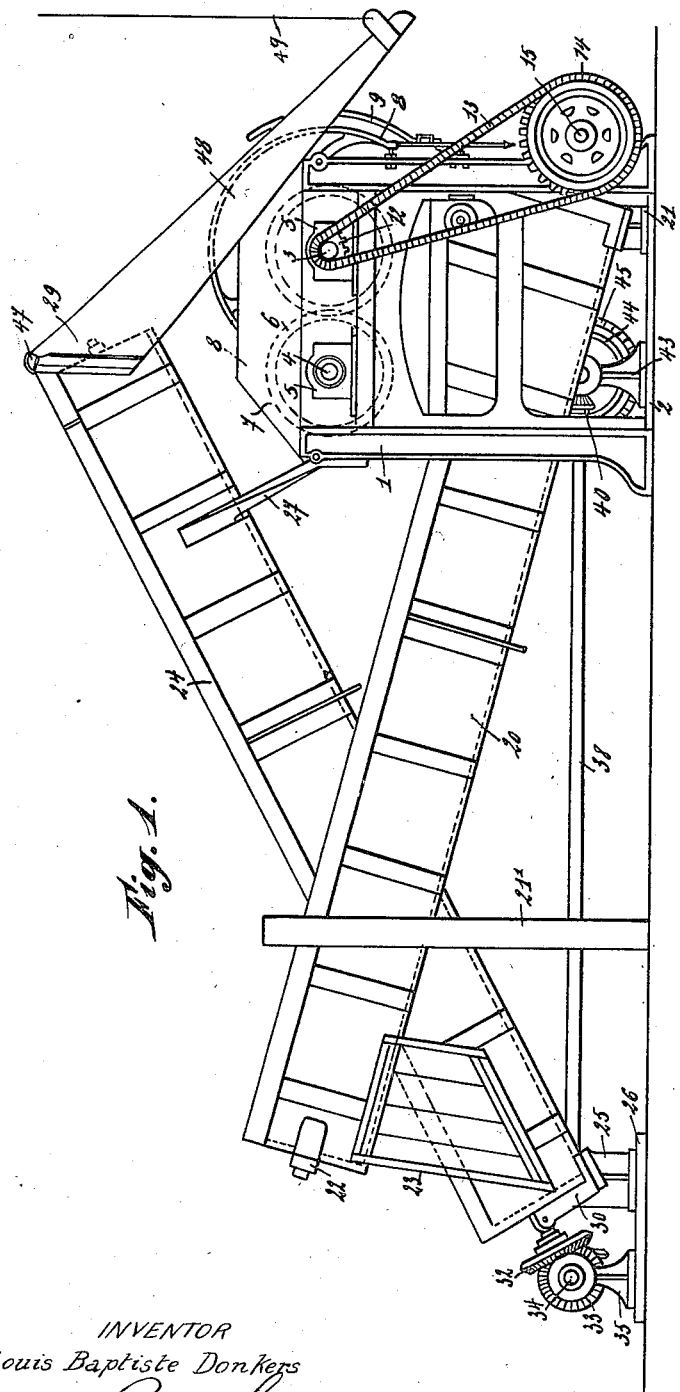

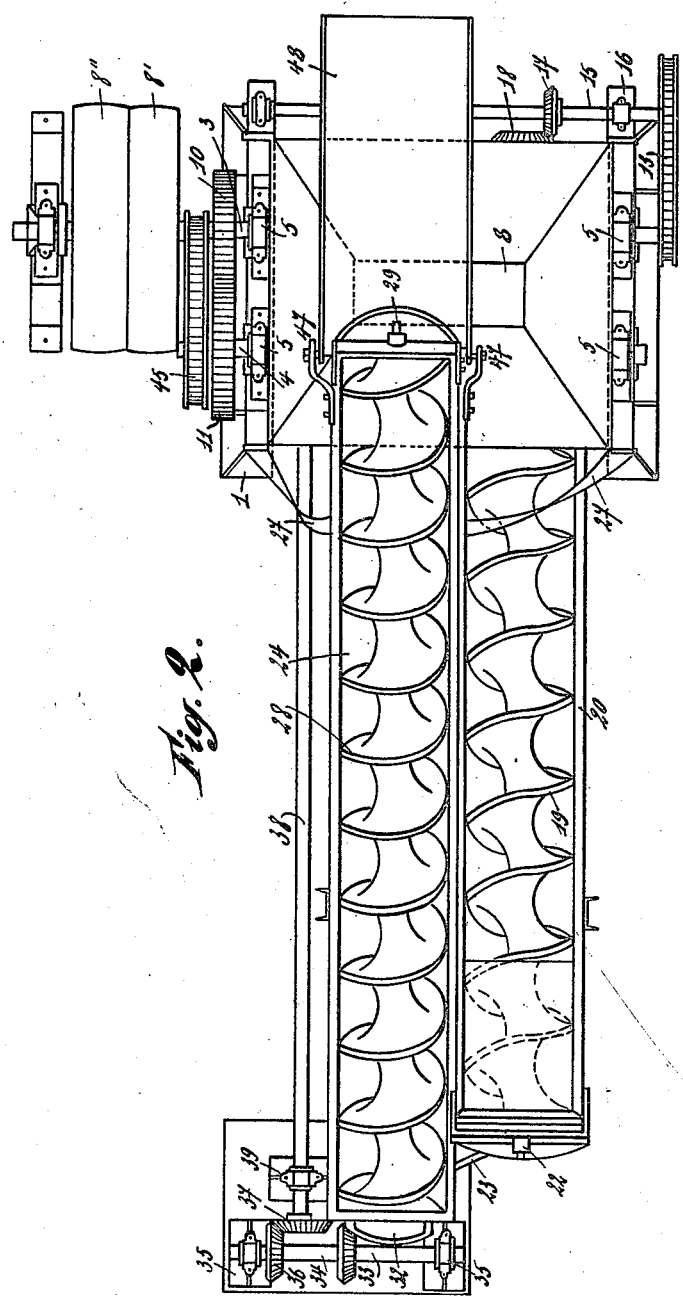

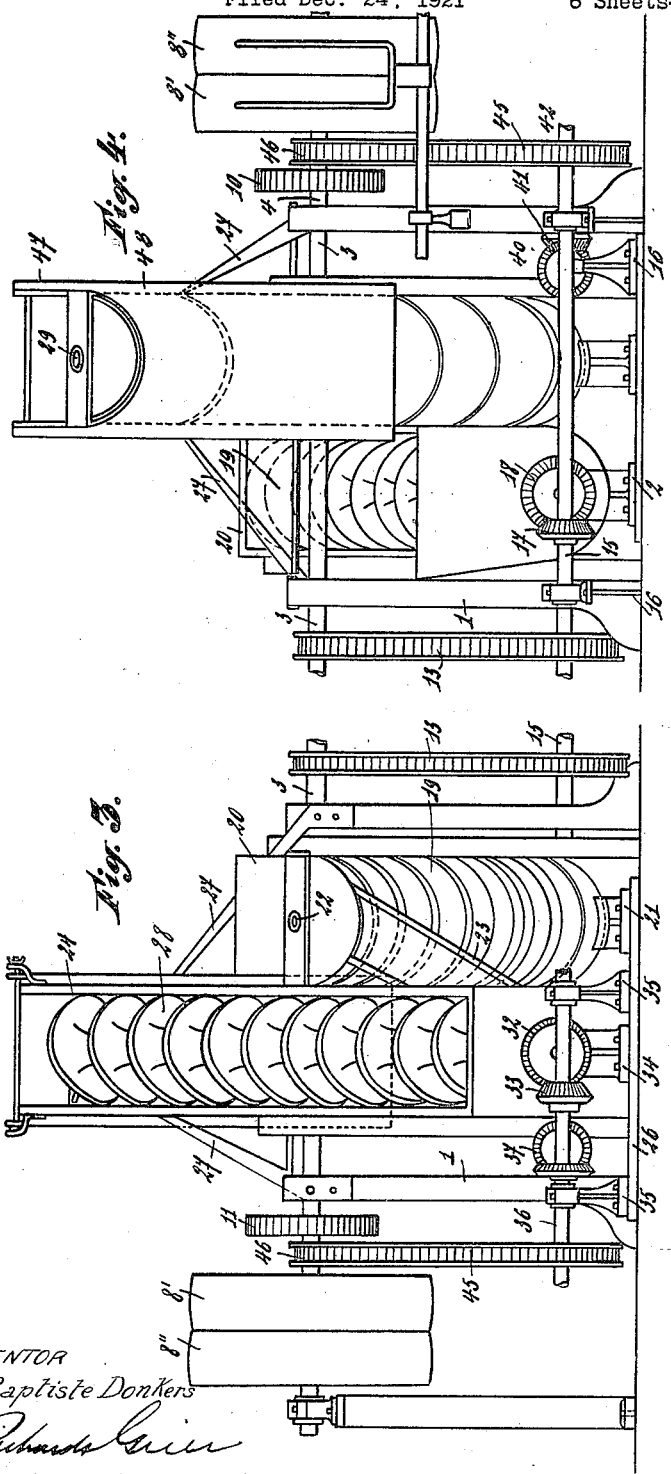

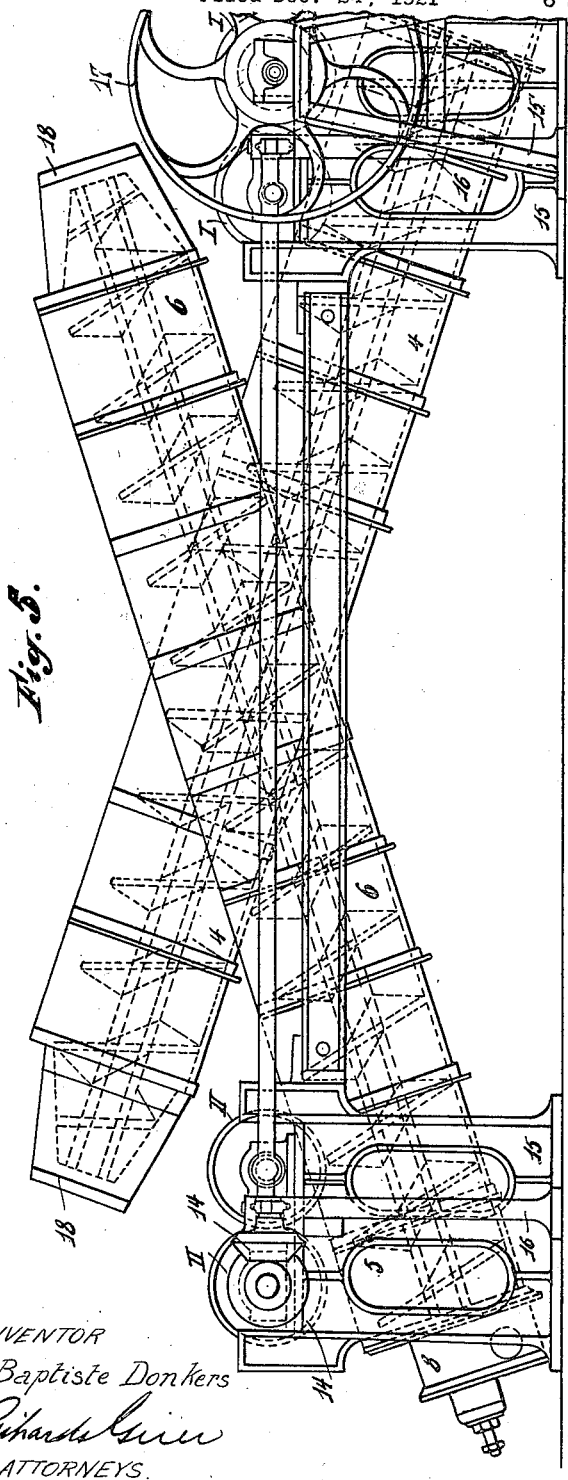

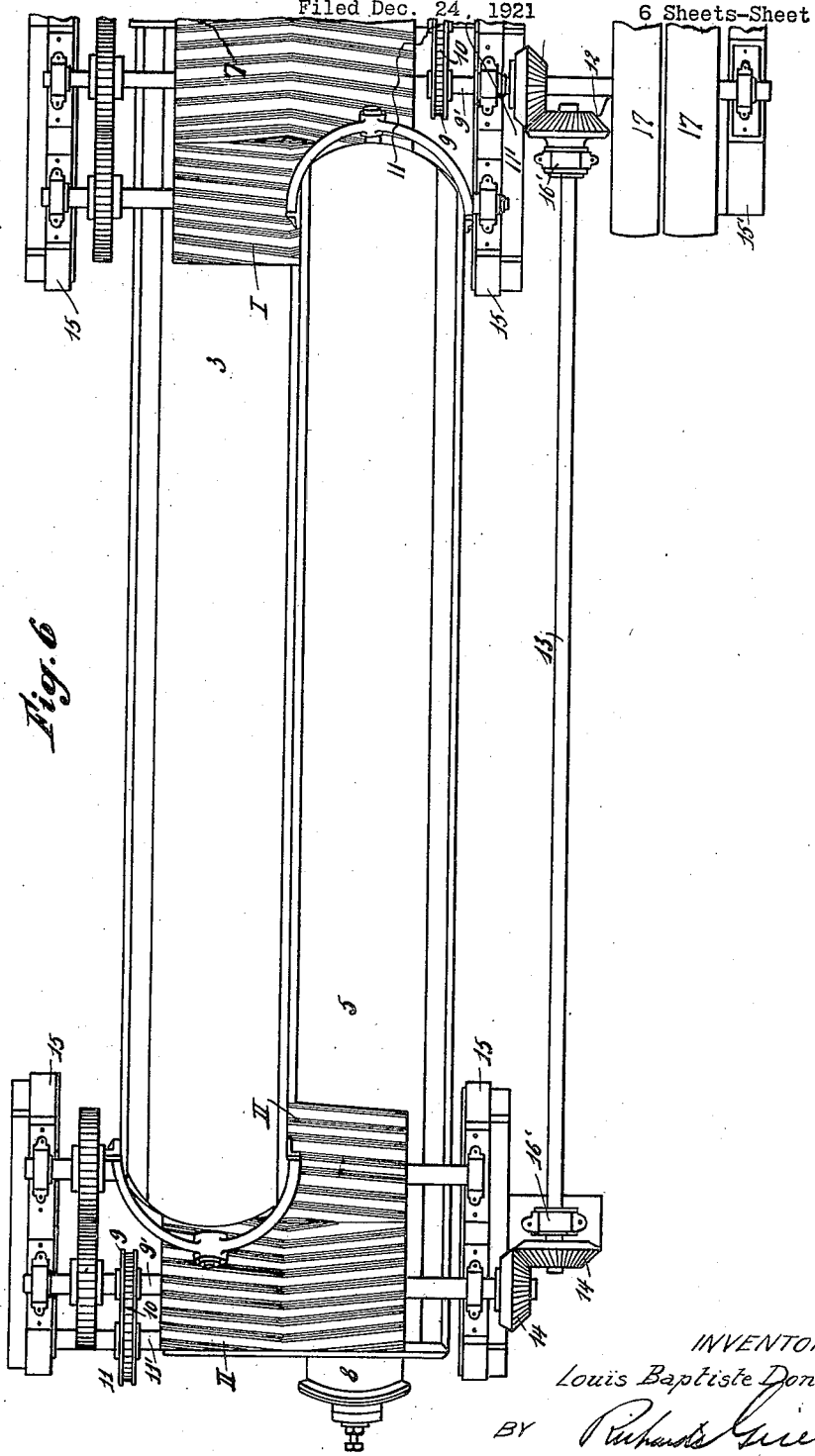

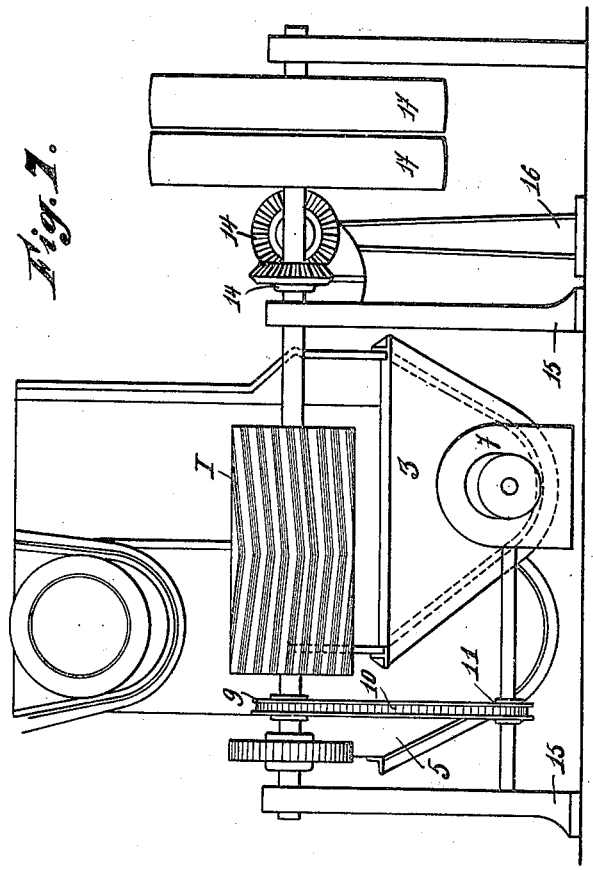

1,467,715

UNITED STATES PATENT OFFICE.

LOUIS BAPTISTE DONKERS, OF ANTWERP, BELGIUM.

AUTOMATIC KNEADING MACHINE.

Application filed December 24, 1921. Serial No. 524,810.

*To all whom it may concern:*

Be it known that I, LOUIS BAPTISTE DONKERS, residing at Antwerp, in the Kingdom of Belgium, 43–45 Rue Moons, a subject of the King of the Belgians, have invented certain new and useful Improvements in Automatic Kneading Machines, of which the following is a specification.

The known kneading machines for butter, margarine and other products, generally have four, six or even more kneading rollers or cylinders (mostly six) and three endless screws, lifting the products to be kneaded and consuming, for this reason, quite a considerable amount of motive power. Furthermore these known kneading machines take much room, they are very expensive and necessitate rather high entertaining expenses. But, the most important technical drawback resides in the fact, that in a kneading machine with three pairs of kneading-rollers or cylinders, the butter or any other product is only kneaded three times in travelling once through the machine or it is kneaded six times when travelling twice through it that is to say, not sufficiently in the first case and too much in the second one. It is impossible with these known machines to predetermine a degree of kneading.

The object of the present invention is to do away with these draw-backs by creating an automatic kneading machine, the essential feature of which is that the butter or any other product to be kneaded successively travels in two troughs, each of which is provided with a rotating endless screw and arrives, when leaving the second trough, between two kneading rollers or cylinders with oblique double teeth or between two pairs of rollers from which the butter or any other product falls back into the first trough so that the product to be treated may be kneaded, at will, a more or less great number of times, according to the necessities, a very simple device being provided for expelling the kneaded product at the desired moment.

Two executory forms of the machine are represented by way of example in the annexed drawings in which:

Fig. 1 is a side elevation of one executory form.

Fig. 2 is a plan view.

Fig. 3 is a front view.

Fig. 4 is a view of the rear end.

Fig. 5 is a side elevation of a modification.

Fig. 6 is a front view thereof.

Fig. 7 is a view on the rear end.

In the first executory form shown in Figs. 1 to 4, in the upper part of a frame 1, of any suitable form, mounted on a base plate 2, are journalled two parallel shafts 3, 4 rotating in bearings 5 each carrying a kneading roller or cylinder 6 having oblique, double teeth. The frame 1 is partially closed above the rollers 6, by means of a lid 7, provided with a suitable aperture 8 for the passage of the butter or other product to be kneaded. The shaft 3 of one of the kneading rollers 6, carries a fixed pulley $8^1$ and pulley $8''$ around which may pass a transmission belt (not shown) and which are provided with an ordinary throw out 9. The two shafts 3 and 4 are mechanically connected through two spur gears 10, 11 of like diameter, so that the two cylinders or rollers 6 will be rotated in opposite directions but at the same speed, when the transmission belt is placed on the fixed pulley $8^1$.

The shaft 3 carries on one of its ends a small sprocket 12, connected through a transmission chain 13 with a large sprocket 14, fixed to the shaft 15 rotating in bearings 16 at the rear end of the machine and carrying a conical wheel 17 meshing with a bevel gear 18 fixed to the shaft of endless screw 19 rotating in an upwardly inclined trough 20 as more especially shown in Fig. 1. The lower end of the trough bears on a support 21 fixed to a base plate 2, whilst the upper end of the trough 20 rests on supports 21 and is provided with a suitable bearing 22 wherein rotates the other end of the endless screw 19. The upper end of the trough 20 is connected through an intermediary connecting trough 23 with the lower end of another trough 24, also inclined upwardly and resting on a support 25 mounted on a base plate 26, whilst the upper part of this trough 24 is supported on brackets 27 fixed to the frame 1 and to the said trough.

In the trough 24 is rotatably mounted an endless screw 28, the shaft of which is maintained, at its upper part in a suitable bearing 29 and at its lower part in a bearing 30. The lower end of the shaft of this endless screw carries a conical toothed wheel 32 meshing with a bevel gear 33 fixed to a horizontal shaft 34 rotating in bearings 35 mounted on the base plate 26. The shaft 34 carries a second bevel gear 36 meshing with a bevel gear 37 fixed onto the end of a longitudinal shaft 38 rotating in bearings 39 and carrying at the other end, a bevelled pinion 40 meshing with a bevel gear 41, fixed onto the shaft 42 rotating in bearings 43 and carrying a large chain wheel 44, connected through a transmission chain 45 with a small chain wheel 46 fixed onto the shaft 4 of the second kneading roller or cylinder 6. In this way, when the transmission belt is placed on the fixed pulley $8^1$, in order to drive the machine, both the kneading rollers or cylinders 6 are rotated in opposite directions, the endless screw 19 of the first trough 20 rotates so as to feed the product to be kneaded upwards and the endless screw 28 of the second trough 24 also rotates so as to feed the product to be kneaded upwards.

To the upper end of the second trough 24, a flap 48 is hinged at 47. This flap can be lowered or lifted by means of a yielding device 49.

The operation of the machine is the following:

The butter or any other product to be kneaded is poured into the first trough 20, in which the butter is fed upwardly through the endless screw 19. Arrived at the upper end of the trough 20, the butter or any other product to be kneaded falls through the intermediary connecting trough 23 into the second trough 24 in which it is also fed upwards. The flap 48 being raised at this moment, the butter leaving the second trough 24 is precipitated onto the two rollers 6, 6, in order to be kneaded by them and when leaving these rollers, the butter falls into the first trough 20 so as to travel a second time through the machine. In this way the butter can be passed as many times as desired between the rollers to obtain exactly a predetermined kneading, corresponding with the requirements.

When the butter has been sufficiently kneaded the flap 48 is lowered into the position shown in Fig. 1. The butter leaving the second trough 24 falls then on the flap 48 descends along it and arrives on a slide, a table or any other receiving device.

For the further operations such as packing and so on the thoroughly worked butter may also be expelled at 22. In this event, it will suffice to shut a suitable drawer (not shown) sliding in suitable guides.

It will be easily noticed that the described machine works without any attendance, that it consumes considerably less motive power than the known machines, that it takes much less room, is less expensive and that the maintainance expenses are highly reduced.

The technical advantage of this machine resides in the fact, that the butter or any other product to be worked can be kneaded exactly to a desired and predetermined degree, which is impossible with the known machines.

The machine according to the second executory form, shown in Figs. 5 to 7, comprises two pairs of kneading rollers I—I, II—II under which are placed the trough 3 and 5 respectively.

From the trough 3 of the first pair of rollers I—I starts an Archimedes' screw 4 ending above the second pair of rollers II and from the trough 5 of the second pair of rollers starts an Archimedes' screw 6 that ends above the first pair of rollers.

Abstracting the driving mechanism of these members that may be of any kind and an executory form of which will be described hereafter, by way of example, the working of the machine is the following:

The butter is thrown on the first pair of kneaders I—I that knead it and let it fall into the lower trough 3, from which the butter is elevated a first time by means of the screw 4 and precipitated on the second pair of rollers II—II, which knead the butter a second time and let it fall into the lower trough 5, from where the endless screw 6 conveys it back to the first pair of rollers I—I, which operation may be repeated as many times as necessary.

When the product has been sufficiently worked, it is expelled at the upper end of either the one or the other endless screw 4 or 6, by means of a drawer with pipe as already described in connection with the first executory form.

The lower end of both the screws 4 and 6 rotates respectively in an hermetically closed box 7, 8, in which each Archimedes' screw carries a bevelled toothed wheel meshing with an endless screw (not shown) mounted on a transversal shaft $11^1$ onto which is fixed a sprocket 11 connected by a transmission chain 10 with a sprocket 9 fixed onto the shaft $9^1$ of one of the two pairs of rollers, respectively I—I and II—II. The shaft $9^1$ of the roller 1 of the first pair of kneading rollers is connected by a bevelled couple 12, 12 with a longitudinal transmission shaft 13, the other end of which is connected by a bevelled couple 14, 14 with the shaft $9^1$ of the roller 11 of the second pair of kneading rollers.

The kneading rollers I—I and II—II rotate in frames 15, 15 whilst the transmission shaft 13 rotates in beatings $16^1$. The shaft $9^1$ of the first pair of rollers I—I carries a fixed pulley and a loose pulley 17 to drive the whole mechanism of the machine, a bearing $15^1$ being provided for the outer end of the shaft adjacent the pulley 17. For the purpose of increasing the compression of the product to be kneaded, the upper end of each cylinder 7 is provided with a compression device 18, narrowed like a nozzle.

The technical advantages of this machine are that, working without the aid of a workman, it only necessitates 50% of the motive power required for driving the ordinary kneading machines with six rollers and 75% of the power that is necessary to drive the kneading machines with eight and ten rollers.

Finally, the place it takes, its cost price and the maintainance expenses, are also reduced of 50%, compared with the existing kneading machines.

Having now fully described my invention, what I claim as new and desire to secure by Letters Patent is:

1. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, and means for delivering the material from the open upper end of each trough to the other trough adjacent the lower end thereof and kneading rollers interposed between the delivering means from one trough to the other.

2. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, means for delivering the material from the open upper end of each trough to the other trough adjacent the lower end thereof and kneading rollers interposed between the delivering means from one trough to the other, and means to retard the passage of the material through the delivery ends of the troughs and thereby create a back pressure which will insure the thorough kneading of the material within the troughs.

3. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, means for delivering the material from the open upper end of each trough to the other trough adjacent the lower end thereof and kneading rollers interposed between the delivering means from one trough to the other, and means secured to the delivery end of each trough, comprising a nozzle having a restricted opening and inclined sides tapering gradually from said opening to the open top end of its respective trough whereby a back pressure is produced upon the material which will insure the thorough kneading thereof within the trough.

4. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, kneading rollers interposed between said troughs, means to deliver the material from said rollers to an adjacent trough, and delivery means to selectively deliver the material from a trough to the kneading rollers or to a suitable receiving table.

5. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, means for delivering the material from the open upper end of each trough to the other trough adjacent the lower end thereof and kneading rollers interposed between the delivering means from one trough to the other, a common driving means and gearing interposed between said common driving means and said screws and rollers to cause simultaneous actuation of all of said parts.

6. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, and means for delivering the material from the open upper end of each trough to the other trough adjacent the lower end thereof and kneading rollers interposed between the delivering means from one trough to the other, said rollers provided with double skew grooves to produce a more thorough kneading.

7. In an automatic kneading machine for butter, margarine or the like, a pair of juxtaposed troughs arranged in oppositely inclined upward directions, said troughs closed at their lower ends and open at their upper ends, a screw in each trough constructed and arranged to convey the material upwardly, the inclination of the troughs causing the material to be subjected to a kneading action during its upward travel, intermediate kneading rollers through which the material may be delivered from the upper end of a trough, means to deliver the material from said kneading rollers to the lower end of an adjacent trough, and delivery means interposed between the said upper end of the trough and the rollers, said delivery means being movable to permit the material to be delivered to said rollers for another passage through the machine or to deliver the material to a suitable receiving device when it is sufficiently kneaded.

In testimony whereof I affix my signature in presence of two witnesses.

LOUIS BAPTISTE DONKERS.

Witnesses:
G. BRAMEE,
J. DE LERSY.